United States Patent [19]
Janssen et al.

[11] Patent Number: 5,558,778
[45] Date of Patent: Sep. 24, 1996

[54] PROCESS FOR THE TREATMENT OF A WASTEWATER

[75] Inventors: Johannes J. Janssen; Arie L. Mos; Theodoor J. L. W. Simons, all of The Hague, Netherlands

[73] Assignee: Shell Oil Company, Houston, Tex.

[21] Appl. No.: 528,184

[22] Filed: Sep. 14, 1995

Related U.S. Application Data

[63] Continuation of Ser. No. 153,392, Nov. 16, 1993, abandoned.

[51] Int. Cl.⁶ .................................................. B01D 35/18
[52] U.S. Cl. .......................... 210/774; 210/805; 210/790; 210/767; 62/66; 62/532; 62/541
[58] Field of Search ..................................... 210/774, 790, 210/805, 806, 178, 181, 770, 767; 62/4, 66, 67, 532, 541

[56] References Cited

U.S. PATENT DOCUMENTS

| | | | |
|---|---|---|---|
| 3,283,522 | 11/1966 | Logwinuk et al. | |
| 3,872,009 | 3/1975 | Thijssen | 210/178 |
| 3,992,900 | 11/1976 | Campbell | 62/541 |
| 4,004,886 | 1/1977 | Thijssen et al. | |
| 4,177,051 | 12/1979 | Adams, Jr. | 62/123 |
| 4,283,211 | 8/1981 | Ehrlich et al. | 62/4 |
| 4,314,455 | 2/1982 | Engdahl | |
| 4,451,273 | 5/1984 | Cheng et al. | 62/532 |
| 4,457,769 | 7/1984 | Engdahl | |
| 4,475,355 | 10/1984 | Thijssen et al. | 62/123 |
| 4,505,728 | 3/1985 | Cheng et al. | 210/774 |
| 4,508,553 | 4/1985 | Thijssen et al. | 426/524 |
| 4,592,768 | 6/1986 | Cutler et al. | 210/652 |
| 4,762,622 | 8/1988 | Thijssen | 62/532 |
| 4,801,436 | 1/1989 | Connery | 62/66 |
| 4,936,114 | 6/1990 | Engdahl et al. | 62/123 |

FOREIGN PATENT DOCUMENTS 2262052  3/1991  United Kingdom.

*Primary Examiner*—Ana Fortuna

[57] ABSTRACT

A process for the treatment of a wastewater feed originating from a styrene/propylene oxide production plant and containing hydrocarbons, aldehydes, ketones, alcohols, phenols and salts, by freeze-concentration combined with salt crystals removal, thereby separating the wastewater feed into an at least two-fold concentrated waste product, salt crystals, and a substantially pure water product.

7 Claims, 2 Drawing Sheets

PROCESS FOR THE TREATMENT OF A WASTEWATER

RELATED APPLICATION

This is a Continuation of Ser. No. 08/153,392 filed Nov. 16, 1993, now abandoned.

FIELD OF THE INVENTION

The present invention relates to a process for the treatment of wastewater which originates from a styrene/propylene oxide production plant.

BACKGROUND OF THE INVENTION

In a typical plant for the production of styrene and propylene oxide (S/PO), the following chemical reactions are conducted, using as feed reactants ethylene, benzene, oxygen, propylene and hydrogen:
1. Ethylene+benzene→ethylbenzene (EB)
2. EB+oxygen→ethylbenzene hydroperoxide (EBHP)
3. EBHP+propylene→propylene oxide(PO)+methyl phenyl carbinol (MPC)+methyl phenyl ketone (MPK)
4. MPK+hydrogen→MPC
5. MPC→styrene+water.

In the above exemplified reactions, organic by-products such as aliphatic and aromatic hydrocarbons, aldehydes, ketones, alcohols, phenols and organic acids are produced, in addition to reaction water. The by-products are separated from the main products, whereby clean water is used and the organic acids are neutralized with an aqueous solution of an alkali (such as sodium carbonate and/or sodium hydroxide). Additional water is introduced with the reaction gas (air) in the second above-exemplified reaction, and as steam in the fifth above-exemplified reaction. Thus on balance the plant as a whole uses clean water, and produces about 50% as much of wastewater which contains a wide variety of organic compounds, many of which are volatile, and organic salts.

The wastewater from an S/PO plant typically contains a total of from 1.0 to 3.5 wt % of non-salt organics and from 3.0 to 6.0 wt % of organic salts. In addition, it may contain from 0.0 to 2.0 wt % of sodium carbonate and sodium bicarbonate, and/or traces of sodium hydroxide depending on the alkali used in the neutralization step mentioned above.

The following is an exemplary composition of the wastewater from an S/PO plant (amounts given in % by weight):

| | | | |
|---|---|---|---|
| methanol | 0.1237 | Sodium formiate | 1.0100 |
| acetaldehyde | 0.0216 | Sodium acetate | 0.8400 |
| ethanol | 0.0233 | Sodium propionate | 0.2900 |
| propionlaldehyde | 0.0023 | Sodium benzoate | 1.9400 |
| acetone | 0.0281 | | |
| propanol-2 | 0.0103 | | |
| propanol-1 | 0.1317 | | |
| benzene | 0.0028 | | |
| mono propylene glycol | 1.2222 | | |
| toluene | 0.0016 | | |
| methyl pentenal | 0.0100 | | |
| ethyl benzene | 0.0036 | | |
| styrene | 0.0045 | | |
| cumene | 0.0007 | | |
| benzaldehyde | 0.2280 | | |
| phenol | 0.2700 | | |
| benzyl alcohol | 0.0026 | | |
| methyl phenyl ketone | 0.0175 | | |
| methyl phenyl carbinol | 0.1636 | | |
| beta phenylethyl alcohol | 0.0058 | | |
| undefined | 0.0604 | | |

The input of clean water to such a plant can be up to several tens of thousands kg per hour, and the output of waste-water is about 50% higher than the input of clean water. The waste-water cannot be discharged without purification. The choice of a purification method for the wastewater of an S/PO plant is greatly restricted by practical, environmental and economic considerations. For example, biological degradation of the untreated wastewater is not feasible, due to the toxicity of several of its components (such as phenol) to the microorganisms involved in such degradation processes. Likewise, concentration by evaporation is not feasible due to evaporation of the volatile components, and distillation would involve prohibitive costs.

The currently employed method for purifying the wastewater stream of S/PO plants is basically a two-step treatment, the first step being oxidation with air at high temperature and pressure (known as the Wet Air Oxidation process, such as is constructed by Zimpro Inc., subsidiary of Sterling Drug Inc., Rothschild, Wis., USA), followed by bacterial degradation. This is a rather expensive procedure, and the need has existed for a long time to replace it by a more economic one.

It is already known to separate a pure substance, in particular water, from its dispersion by cooling the dispersion to below the freezing point of the intended pure substance (water) and separating the (ice) crystals. Various methods employing this principle, known as freeze-concentration or freeze-crystallization, are disclosed in, e.g., U.S. Pat. No. 3,283,522; U.S. Pat. No. 3,992,900; U.S. Pat. No. 4,004,886; U.S. Pat. No. 4,314,455; U.S. Pat. No. 4,457,769; U.S. Pat. No. 4,508,553 and U.S. Pat. No. 4,936,114. In several of these and other publications, the use of freeze-concentration has been proposed in general terms for desalinating sea water, and also for purifying unspecified wastewater. However, in practice freeze-concentration has been used predominantly in the food-industry, for the concentration of e.g. fruit juices, coffee extracts, milk and beer. It has not been used before for the large-scale treatment of wastewater from a chemical plant, in particular of the wastewater originating from an S/PO plant.

It has now been found that the principle of freeze-concentration can be successfully and economically employed for the separation of substantially pure water from the wastewater of an S/PO plant, whereby the wastewater can be concentrated at least two-fold, and preferably at least four-fold.

SUMMARY OF THE INVENTION

The present invention provides a process for treating a wastewater feed originating from a styrene monomer/propylene oxide production plant by freeze-concentration combined with organic salt crystals removal, thereby separating the wastewater feed into an at least two-fold concentrated waste product, organic salt crystals, and a substantially pure welter product.

DESCRIPTION OF THE PREFERRED EMBODIMENTS

Figure 1:
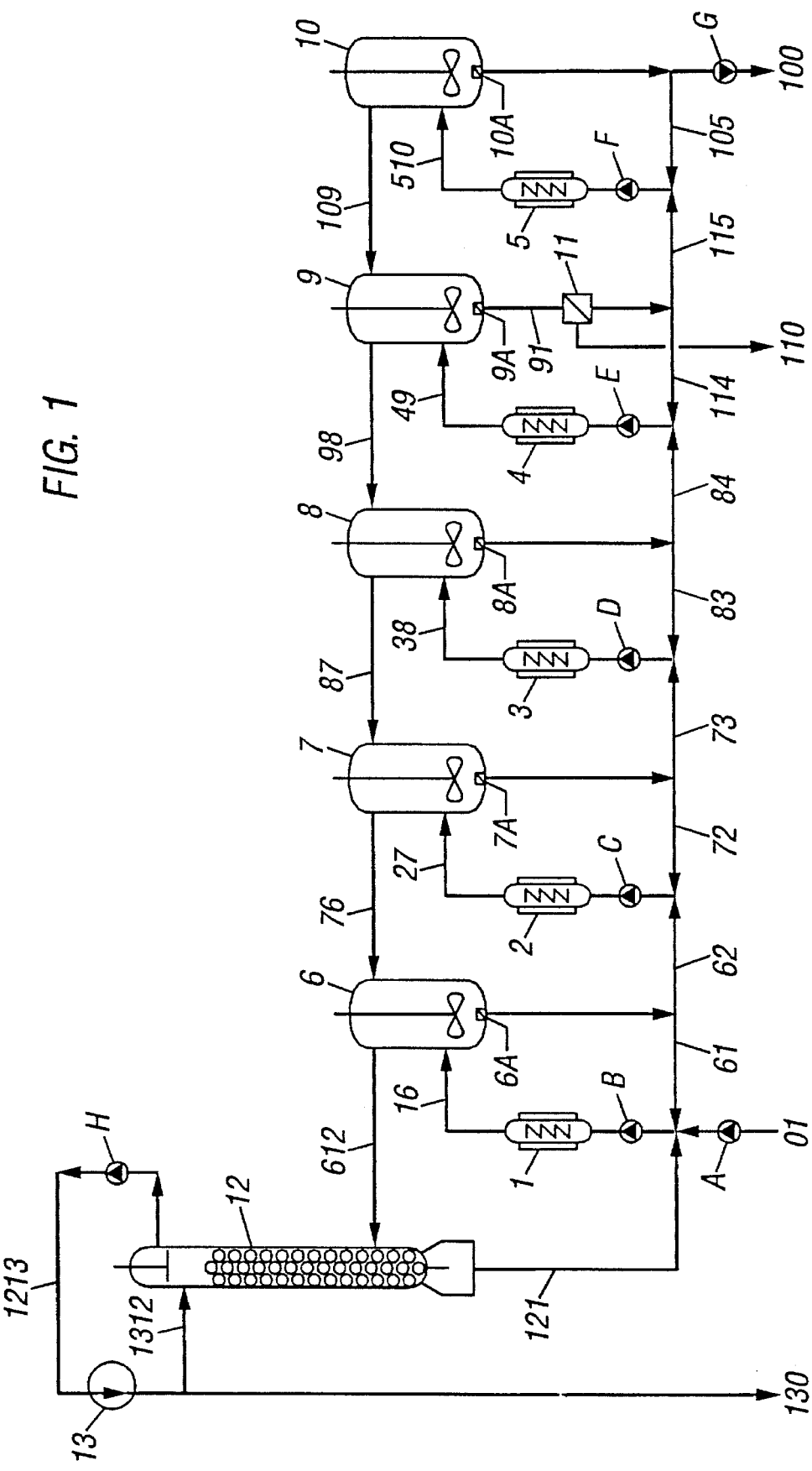
FIG. 1 is a view of the system utilized for treating a wastewater feed comprising multiple ice nucleation units, multiple growth units, a salt crystals removal unit and an ice separation unit.

The wastewater feed of the present invention originates from a styrene-propylene oxide production plant and contains hydrocarbons, aldehydes, ketones, alcohols, phenols and organic salts. The process utilized to treat the wastewater stream involves freeze-concentration combined with organic salt crystals removal. As a result, the wastewater feed is separated into an at least two-fold concentrated waste product, organic salt crystals, and a substantially pure water product.

The at least two-fold concentrated waste product (concentrate) contains preferably a maximum of about 85% w/w of water. More preferably, the maximum water content is about 70% w/w.

The substantially pure water product typically contains a maximum of about 0.005% w/w of impurities. Preferably, it contains a maximum of about 0.002% w/w of impurities. Such pure water is suitable in principle for any normal use. In a preferred embodiment of the invention, the substantially pure water product is partly recirculated to the S/PO production plant.

When substantially pure water is to be separated by freeze-concentration from the wastewater feed of an S/PO plant, having the composition as described hereinbefore, it has been found to be very important to make the ice crystals as big as possible, in order to enable their efficient separation from the concentrate and from the smaller crystals of the organic salts, which tend also to be formed when the wastewater feed is cooled.

Bigger ice crystals are formed when the crystallization is performed in two separate units, a nucleation unit followed by a growth unit. In the nucleation unit the wastewater feed is cooled, preferably indirectly, until very small ice crystals are formed. The slurry containing these small ice crystals is conducted to the growth unit, wherein the temperature is higher than the melting temperature of small ice crystals but lower than the melting temperature of bigger ice crystals. As a consequence, small ice crystals will melt and bigger ice crystals will grow in the growth unit.

In practice, the temperature in the nucleation unit in the process of the present invention is from about −5° C. to about −20° C., and in the growth unit from about −3° C. to about −18° C., depending on the concentration of the wastewater feed: the higher the concentration, the lower the temperature needed. The size of the ice crystals thus prepared is typically in the range of from about 0.2 mm to about 0.8 mm.

When ice crystals of sufficient size and quantity have been formed in the slurry, they are separated from the mother liquor (concentrate) by a separation step. This can be done in principle by pressing the slurry, by centrifuging thereof and, preferably, by filtration of the slurry followed by washing the ice crystals in a wash column. A preferred wash column is the packed bed wash column.

In the packed bed wash column, the ice crystals-containing slurry is introduced under pressure and the crystal-free mother liquor (concentrate) is filtered off at one end, typically the lower end of a vertically operating wash column, leaving a packed bed of ice crystals. The washed crystals or their melt (substantially pure water) are removed at the opposite end, typically the upper end of a vertically operating wash column. Part of the melt can be used as wash water, to wash the ice crystals.

The packed bed wash column is filled with ice crystals, which are washed by the wash water typically introduced from above the ice crystals. In this situation, the upper part of the ice crystals packed bed is the already washed part, the lower part thereof is the yet unwashed part, and their interface is the wash line. The pressure within the wash column forces the ice crystals upward and the wash water downward. The wash water recrystallizes in the wash front, which ensures that it does not dilute the concentrate. The level of the wash front is maintained by controlling the pressure in the ice bed.

U.S. Pat. No. 3,872,009 describes a packed bed wash column, wherein the slurry containing the ice crystals is introduced into the wash column by a piston, operating discontinuously. Other possible devices for introducing the ice crystals-containing slurry into the wash column are by hydraulic force and by a transport screw, both of which can be operated continuously. U.S. Pat. No. 4,475,355 describes a packed bed wash column, operating continuously by a transport screw.

It has been found to be difficult to freeze concentrate the wastewater feed of the present invention to a sufficient degree of concentration by a single sequence of nucleation, ice crystal growth and separation, that is in a single-stage operation system such as described in U.S. Pat. No. 4,004,886. This is because, as the ice crystals grow in size and number and the mother liquor is concurrently concentrated, the dynamic viscosity of the slurry is increased exponentially, which greatly limits the efficiency of the system, in particular that of the wash column. Another important factor is the low ice crystal growth rate at high viscosities.

In order to overcome this problem, multi-stage freeze-concentration systems have been devised, such as described in U.S. Pat. No. 4,508,553. In these systems, which are preferred for the operation of the present invention, mother liquor flows through a series of alternating nucleation and growth units and ice crystals flow in a counter-current fashion through the growth units from the last to the first one. The mother liquor in its most concentrated form is then discharged from the last growth unit, while a slurry containing substantially all of the bigger ice crystals and mother liquor of a relatively low concentration and dynamic viscosity are led from the first growth unit to the wash column. In this way the limiting factor for concentrating the wastewater is removed in the multi-stage operating system, by effecting a lower viscosity of the slurry fed to the wash column.

The salts (mainly organic salts) present in the wastewater feed tend to precipitate and crystallize when the wastewater is cooled, and as it is concentrated, because of their lower solubility in cold water and because of the higher concentration. The salt crystals thus formed have to be separated from the mother liquor and, more importantly, from the ice crystals. The size of the salt crystals is initially typically in the range of from about 0.01 mm to about 0.15 mm, which is much smaller than the size of the big ice crystals, when prepared as described hereinbefore. Therefore, the salt crystals can be removed from the cooled slurry before their size increases to approximate that of the ice crystals. This is conveniently performed, e.g. by filtration or centrifugation, in a salt removal unit positioned after a filter in a growth unit 6–10, which filter holds off the bigger ice crystals. The thus separated salt crystals can then be processed separately, or they can be added to the concentrate end product and processed therewith.

The invention is further illustrated by FIG. 1, which represents a preferred embodiment of the invention, comprising a wastewater feed inlet 01, five alternating nucleation and growth units 1–5 and 6–10 respectively, the growth units each provided with a filter 6A–10A respectively, a salt filtration unit 11, a salts outlet 110, a wash column 12, an ice melting vessel/heat exchanger 13, a wastewater concentrate outlet 100 and a pure water product outlet 130. In the drawing, the conduits are indicated by numbers, reciting the number of their unit of origin and destination. Pumps mounted in the conduits are indicated by letters, A–G.

In this embodiment, all nucleation units are identical, as also are all growth units. The nucleation units are indirectly cooling refrigerants (scraped surface heat exchangers). The growth units are isolated mixing vessels, in which the temperature is higher than the temperature in the nucleation units and lower than the melting temperature of the desired bigger ice crystals.

Typically, the temperature is kept at a progressively declining level from about −5° C. to about −20° C. for the nucleation units 1–5, and from about −3° C. to about −18° C. for the growth units. The growth units are typically each provided with a filter 6A–10A, capable of holding back all particles which in this embodiment are bigger than about 0.2 mm. The salt filtration unit is a decanter centrifuge. The wash column in this embodiment is a packed bed wash column, operated by a transport screw.

As will be apparent from FIG. 1, in this embodiment the wastewater feed is led through the succession of nucleation and growth units, whereby liquid is partly recirculated to the foregoing nucleation unit and ice crystals are completely recirculated to the foregoing growth unit. This provides an optimization of crystal growth, and minimal viscosity of the slurry reaching the wash column.

The wash liquid is completely recirculated in this embodiment from the wash column to the first nucleation unit. The pure water product is partly recirculated to the S/PO plant, to provide the entire water consumption of the plant, while the remaining part (about ⅓ of the total) remains available for any other normal use. The waste concentrate is disposed of, preferably by incineration. The salt crystals can be disposed of separately, or together with the waste concentrate.

The ranges and limitations provided in the instant specification and claims are those which are believed to particularly point out and distinctly claim the invention. It is, however, understood that other ranges and limitations that perform substantially the same function, in substantially the same way to obtain the same or substantially the same result are intended to be within the scope of the instant invention as defined by the instant specification and claims.

The invention will be further described by the following Example which is provided for illustrative purposes only and is not to be construed as limiting the invention. The Example describes an experiment, wherein a single-stage freeze-concentration system (sequence of nucleation, ice crystal growth and separation) was operated by continuous recirculation, thus allowing for a gradual buildup of the concentration of the recirculated mother liquor, comparable to what is achieved in a multi-stage system.

EXAMPLE

A wastewater sample from an S/PO production plant was used as feed to the freeze-concentration system. This feed contained 2.3 wt % of organics, 5.6 wt % of organic sodium salts and 1 to 1.5 wt % of sodium carbonate and sodium bicarbonate. The Chemical Oxygen Demand (COD) of the sample feed was 124 g/liter.

The progress of the freeze-concentration process with respect to obtained degree of concentration was monitored with a refractometer. The refractive index was expressed in °Brix (unit of measure, indicating wt % of sucrose dissolved in water). The refractive index of the sample feed was 12 °Brix.

Figure 2:
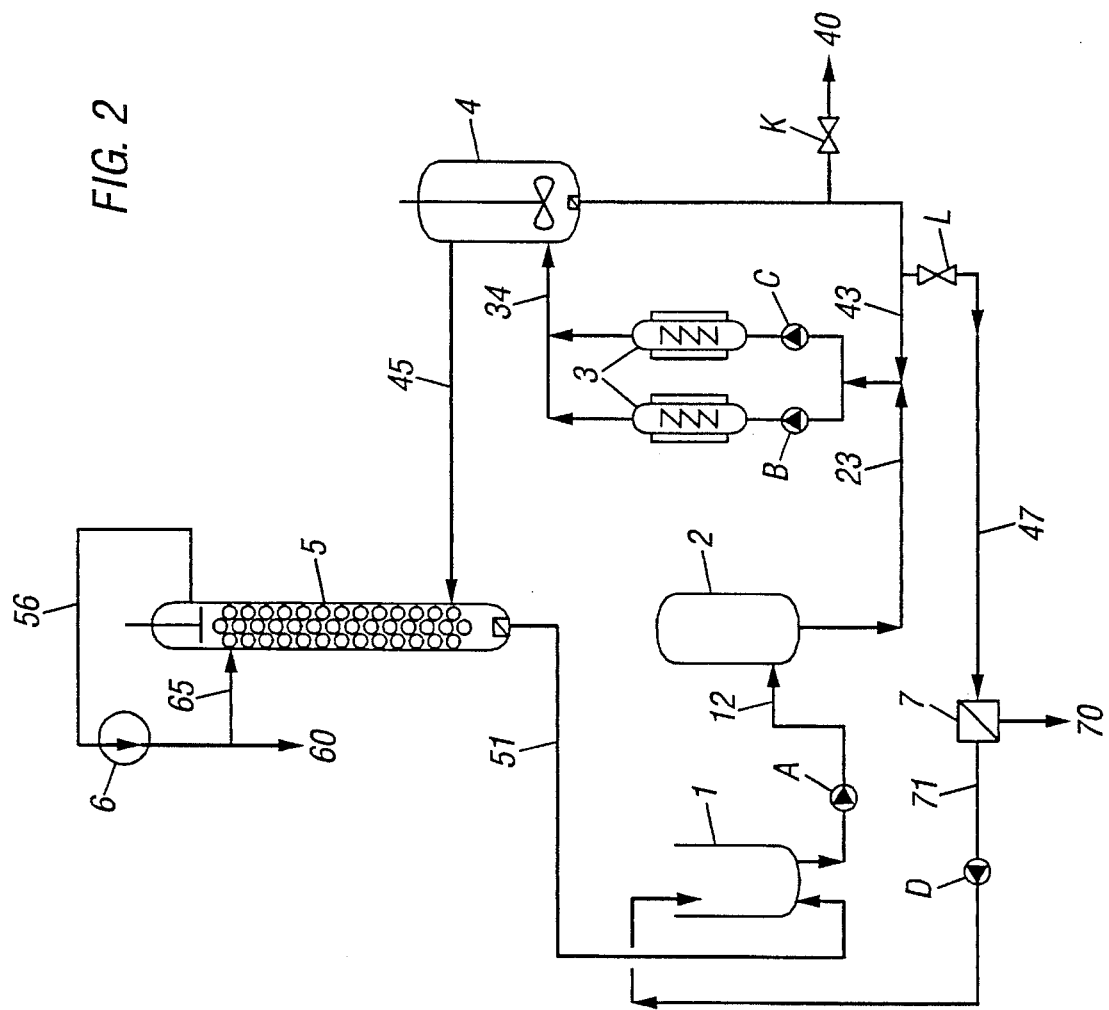
FIG. 2 is a view of an alternative embodiment of the system utilized for treating a wastewater feed.

With reference to FIG. 2, the freeze-concentration system used was as follows. The wastewater feed was fed through conduit 12 via pump A from storage vessel 1 to pressurized vessel 2 (operating at about 200 kPa). From vessel 2 the stream was routed via pumps B and C and conduit 23 to two parallel nucleation units 3 (scraped surface heat exchangers), using a refrigerant to cool down the wastewater slurry.

The cooled wastewater slurry, now containing ice crystallites, was routed from 3 through conduits 34 to growth unit 4 (thermically isolated mixing vessel, initial operating temperature −2° C., provided at its outlet to conduit 43 with a filter). Through this filter about 95% of the feed to 4, free of big ice crystals, was recirculated through conduit 43 to 3.

Valve K and conduit 40 provided for the possibility to discharge wastewater concentrate. Valve L and conduit 47 provided for the possibility to route part of the wastewater concentrate over filter 7 (pore diameter 0.106 mm). Precipitated salts (70) were removed from 7 whilst filtrate was sent to storage vessel 1 via pump D and conduit 71.

Also from 4, about 5% of the feed to 4, containing 30% of its weight as ice crystals, was routed through conduit 45 to wash column 5 (packed bed piston type wash column, diameter 6 cm). From the wash column the ice crystals were removed overhead by an ice scraper via conduit 56 to heat exchanger 6, using steam to melt the ice crystals. Part of the melt was recirculated back from 6 to 5 via conduit 65 and functioned as wash water and the remainder, constituting a net flow of (maximum) 10 kg/h of melt, was discharged from the system..

Also from the wash column, the washing of the ice crystals was recirculated, through a filter, by conduit 51 to storage vessel 1.

During the experiment, the feed through 12 was kept constant at about 100 kg/hr. Melt was constantly discharged at rates between 2 and 10 l/h (average: 6 l/h). Valve K was kept closed for the first 65 hours of the experiment. A flow of between 10 and 60 l/h (average 30 l/h) over filter 7 was maintained, removing 500 to 900 g/h (average 600 g/h) of wet precipitate with a solid content of 30% w/w (determined by drying).

Since ice crystals melt was continuously discharged from the system during this stage and the mother liquor was completely recirculated, the waste products concentration increased during the first 65 hours of the experiment.

After 20 hours of operation, temperature in 4 was −11° C. The water discharged from 60 had a refractive index of 0.0 °Brix, a COD of 0.04 g/l and a total salts content close to the detection limits of High Performance Ion Exclusion Chromatography (5 ppm).

After 36 hours of operation, the mother liquor had a refractive index of 36 °Brix. Temperature in 4 was −16° C. A sample of the mother liquor had a COD of 360 g/l and a refractive index of 36 °Brix. It contained 9.0 wt % of non-salt organics and 19.1 wt % of sodium salts. The wash water discharged from 60 had a refractive index of 0.4 °Brix, and a COD of 0.37 g/l.

After 65 hours of operation with complete circulation of the mother liquor, refractive index of the mother liquor reached 37 °Brix. Temperature in 4 was −16° C. At that point valve K was opened to discharge 2.2 kg/h of mother liquor (wastewater concentrate) from the system. The remainder of the wastewater concentrate was recirculated to nucleation units 3 via conduit 43. Melt was discharged from 60 at a flow rate of 7.5 l/h. This melt had a refractive index of 0.8 °Brix and a salts content of 330 ppm (0.033 wt %). Production of wastewater concentrate was stopped after another 20 hours.

What is claimed is:

1. A process for the treatment of a wastewater feed containing hydrocarbons, aldehydes, ketones, alcohols, phenols and salts originated from a styrene monomer/propylene oxide production plant, said process comprising:
   a. cooling said wastewater feed to form a freeze concentrate comprising salt crystals, a concentrated waste product and a substantially pure water product in the form of ice crystals;
   b. separating said ice crystals from said freeze concentrate to form a residual freeze concentrate comprising said salt crystals and said concentrated waste product; and
   c. removing said salt crystals from said residual freeze concentrate wherein said freeze concentrate contains at least twice the amount of waste products as said wastewater.

2. The process of claim 1 wherein said substantially pure water product is partly recirculated to said production plant.

3. The process of claim 1 wherein said step a) comprises at least one ice nucleation step and at least one ice crystals growth step.

4. The process of claim 3 wherein said ice crystals are separated using a packed bed wash column.

5. A process for the treatment of a wastewater feed containing water, hydrocarbons, aldehydes, ketones, alcohols, phenols and salts, originated from a styrene monomer/propylene oxide production plant utilizing a freeze concentrate system comprising a series of alternating ice nucleation and growth units, at least one salt crystals removal unit and at least one ice separation unit, said process comprising:
   a. introducing a wastewater feed into a first ice nucleation unit;
   b. cooling said wastewater feed in said first ice nucleation unit to a temperature from about −5° C. to about −20° C. thereby forming a slurry comprising salt crystals, a concentrated waste product and a substantially pure water product in the form of small ice crystals;
   c. passing said slurry to a first growth unit;
   d. forming larger ice crystals in said slurry by maintaining said first growth unit at a temperature lower than the temperature in said first ice nucleation unit whereby said temperature in said first growth unit is greater than the melting point of said small ice crystals but lower than the melting point of said larger ice crystals;
   e. withdrawing said larger ice crystals along with a minor amount of said concentrated waste product and a minor amount of salt crystals from said first growth unit and passing said larger ice crystals along with said minor amount of said concentrated waste product and said minor amount of salt crystals to an ice separation unit where said larger ice crystals are separated from said minor amount of concentrated waste product and said minor amount of salt crystals;
   f. withdrawing the remaining portion of said concentrated waste product and said salt crystals from said first growth unit;
   g. passing a small portion of said concentrated waste product and said salt crystals from said growth unit for use as a feed in said first ice nucleation unit and passing the remainder thereof to a subsequent ice nucleation unit;
   h. cooling said feed in said subsequent ice nucleation unit to a temperature lower than the temperature in said first growth unit thereby forming a slurry comprising salt crystals, a concentrated waste product and a substantially pure water product in the form of small ice crystals;
   i. passing said slurry to a subsequent growth unit;
   j. forming larger ice crystals in said slurry by maintaining said subsequent growth unit at a temperature lower than the temperature in said subsequent ice nucleation unit whereby said temperature in said subsequent growth unit is greater than the melting point of said small ice crystals but lower than the melting point of said larger ice crystals;
   k. withdrawing said larger ice crystals along with a minor amount of concentrated waste product and a minor amount of salt crystals from said subsequent growth unit and passing said larger ice crystals along with said minor amount of concentrated waste product and said minor amount of salt crystals to a preceding growth unit;
   l. withdrawing the remaining portion of said concentrated waste product and said salt crystals from said subsequent growth unit;
   m. passing a small portion of said concentrated waste product and said salt crystals from said subsequent growth unit for use as a feed in a preceding ice nucleation unit and the remaining portion to a subsequent ice nucleation unit; and
   n. separating said salt crystals from said concentrated waste product utilizing at least one salt crystals removal unit located at the output of a select one of said growth units.

6. The process of claim 5 wherein said ice separation unit comprises a packed bed wash column.

7. The process of claim 5 wherein said concentrated waste product is discharged from the last growth unit in said series of ice nucleation units and growth units.

* * * * *